US008639242B2

(12) United States Patent
Michaelis et al.

(10) Patent No.: US 8,639,242 B2
(45) Date of Patent: Jan. 28, 2014

(54) METHODS AND SYSTEMS FOR REGISTRATIONS AND SERVICE ANNOUNCEMENTS IN PEER-TO-PEER NETWORKS VIA CELLULAR OVERLAYS

(75) Inventors: Oliver Michaelis, San Diego, CA (US); J. Rodney Walton, San Diego, CA (US); John W. Ketchum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 975 days.

(21) Appl. No.: 12/575,463

(22) Filed: Oct. 7, 2009

(65) Prior Publication Data

US 2011/0081908 A1   Apr. 7, 2011

(51) Int. Cl.
*H04W 4/00*   (2009.01)

(52) U.S. Cl.
USPC ............. 455/434; 455/435.1; 455/432.3; 455/414.1; 455/422.1

(58) Field of Classification Search
USPC ............. 455/435.1, 434, 432.3, 414.1, 422.1
See application file for complete search history.

(56) References Cited

U.S. PATENT DOCUMENTS

| 6,954,641 | B2 | 10/2005 | McKenna et al. | |
|---|---|---|---|---|
| 2003/0050963 | A1* | 3/2003 | Lamming et al. | 709/203 |
| 2004/0162871 | A1* | 8/2004 | Pabla et al. | 709/201 |
| 2005/0148315 | A1 | 7/2005 | Sawada | |
| 2005/0254472 | A1 | 11/2005 | Roh et al. | |
| 2006/0205415 | A1* | 9/2006 | Rezaiifar et al. | 455/452.2 |
| 2007/0218929 | A1* | 9/2007 | Kuo | 455/466 |
| 2009/0141692 | A1* | 6/2009 | Kasslin et al. | 370/338 |
| 2009/0240794 | A1* | 9/2009 | Liu et al. | 709/223 |
| 2011/0075589 | A1* | 3/2011 | Bradley et al. | 370/254 |
| 2011/0211219 | A1* | 9/2011 | Bradley et al. | 358/1.15 |

FOREIGN PATENT DOCUMENTS

| JP | 2008517554 A | 5/2008 |
|---|---|---|
| JP | 2008289045 A | 11/2008 |
| WO | 2004068742 A1 | 8/2004 |
| WO | 2006043963 A1 | 4/2006 |

OTHER PUBLICATIONS

International Preliminary Report on Patentability for PCT/US2010/051716 dated Nov. 10, 2011 issued by the European Patent Office serving as the International Preliminary Examining Authority.
Chapter II Demand & Response Under PCT Article 34 dated Aug. 5, 2011 filed by Applicant to the European Patent Office serving as the International Preliminary Examining Authority.
International Search Report and Written Opinion—PCT/US2010/051716, International Search Authority—European Patent Office—Feb. 17, 2011.
Taiwan Search Report—TW099134233—TIPO—Oct. 16, 2013.

* cited by examiner

*Primary Examiner* — Khalid Shaheed
(74) *Attorney, Agent, or Firm* — QUALCOMM IP Department; James Hunt Yancey, Jr.

(57) ABSTRACT

Certain embodiments of the present disclosure relate to a method and an apparatus for registration and service announcements in peer-to-peer wireless networks to increase capacity of such networks. The present disclosure proposes a hybrid registration mechanism allowing a peer-to-peer node to leverage an administrative architecture of a neighboring cellular system.

40 Claims, 6 Drawing Sheets

FIG. 5A

METHODS AND SYSTEMS FOR REGISTRATIONS AND SERVICE ANNOUNCEMENTS IN PEER-TO-PEER NETWORKS VIA CELLULAR OVERLAYS

TECHNICAL FIELD

Certain embodiments of the present disclosure generally relate to wireless communications and, more particularly to registration and announcements of services in peer-to-peer networks by using cellular links.

BACKGROUND

Nodes in peer-to-peer (P2P) networks make themselves known to other nodes (their peers) by a registration mechanism. In addition, the nodes of the P2P networks can advertise services they offer to their peers in the form of service advertisement messages. Such services can, for example, provide connectivity and/or access to other nodes' content.

Unfortunately, particularly in areas with a dense population, the signaling overhead generated when a large number of nodes are registering with their peers and advertising their services can have an adverse effect on network performance.

SUMMARY

Certain embodiments of the present disclosure provide a method for wireless communications by a wireless node in a peer-to-peer network. The method generally includes maintaining, at the wireless node, a list of available services offered in the peer-to-peer network, receiving, from a base station of a cellular network, a consolidated list of services offered by one or more wireless nodes of the peer-to-peer network within a coverage area of the base station, and updating the list of available services based on information in the consolidated list received from the base station.

Certain embodiments of the present disclosure provide a method for wireless communications by a base station of a cellular network. The method generally includes receiving, from at least one wireless node of a peer-to-peer network, at least one advertisement of one or more services offered by the at least one wireless node, updating a consolidated list of services offered by wireless nodes of the peer-to-peer network that are within a coverage area of the base station to include the services offered by the at least one wireless node, and broadcasting the consolidated list of services, from the base station, to one or more wireless nodes of the peer-to-peer network.

Certain embodiments of the present disclosure provide an apparatus for wireless communications by a wireless node in a peer-to-peer network. The apparatus generally includes logic for maintaining, at the wireless node, a list of available services offered in the peer-to-peer network, logic for receiving, from a base station of a cellular network, a consolidated list of services offered by one or more wireless nodes of the peer-to-peer network within a coverage area of the base station, and logic for updating the list of available services based on information in the consolidated list received from the base station.

Certain embodiments of the present disclosure provide an apparatus for wireless communications by a wireless node in a peer-to-peer network. The apparatus generally includes logic for receiving, from at least one wireless node of a peer-to-peer network, at least one advertisement of one or more services offered by the at least one wireless node, logic for updating a consolidated list of services offered by wireless nodes of the peer-to-peer network that are within a coverage area of the base station to include the services offered by the at least one wireless node, and logic for broadcasting the consolidated list of services, from the base station, to one or more wireless nodes of the peer-to-peer network.

Certain embodiments of the present disclosure provide an apparatus for wireless communications by a wireless node in a peer-to-peer network. The apparatus generally includes means for maintaining, at the wireless node, a list of available services offered in the peer-to-peer network, means for receiving, from a base station of a cellular network, a consolidated list of services offered by one or more wireless nodes of the peer-to-peer network within a coverage area of the base station, and means for updating the list of available services based on information in the consolidated list received from the base station.

Certain embodiments of the present disclosure provide an apparatus for wireless communications by a wireless node in a peer-to-peer network. The apparatus generally includes means for receiving, from at least one wireless node of a peer-to-peer network, at least one advertisement of one or more services offered by the at least one wireless node, means for updating a consolidated list of services offered by wireless nodes of the peer-to-peer network that are within a coverage area of the base station to include the services offered by the at least one wireless node, and means for broadcasting the consolidated list of services, from the base station, to one or more wireless nodes of the peer-to-peer network.

Certain embodiments of the present disclosure provide a computer-program product for wireless communications by a wireless node in a peer-to-peer network, comprising a computer-readable medium having instructions stored thereon, the instructions being executable by one or more processors. The instructions generally include instructions for maintaining, at the wireless node, a list of available services offered in the peer-to-peer network, instructions for receiving, from a base station of a cellular network, a consolidated list of services offered by one or more wireless nodes of the peer-to-peer network within a coverage area of the base station, and instructions for updating the list of available services based on information in the consolidated list received from the base station.

Certain embodiments of the present disclosure provide a computer-program product for wireless communications by a wireless node in a peer-to-peer network, comprising a computer-readable medium having instructions stored thereon, the instructions being executable by one or more processors. The instructions generally include instructions for receiving, from at least one wireless node of a peer-to-peer network, at least one advertisement of one or more services offered by the at least one wireless node, instructions for updating a consolidated list of services offered by wireless nodes of the peer-to-peer network that are within a coverage area of the base station to include the services offered by the at least one wireless node, and instructions for broadcasting the consolidated list of services, from the base station, to one or more wireless nodes of the peer-to-peer network.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered

DETAILED DESCRIPTION

The word "exemplary" is used herein to mean "serving as an example, instance, or illustration." Any embodiment described herein as "exemplary" is not necessarily to be construed as preferred or advantageous over other embodiments.

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

Exemplary Wireless Communication System

Figure 1:
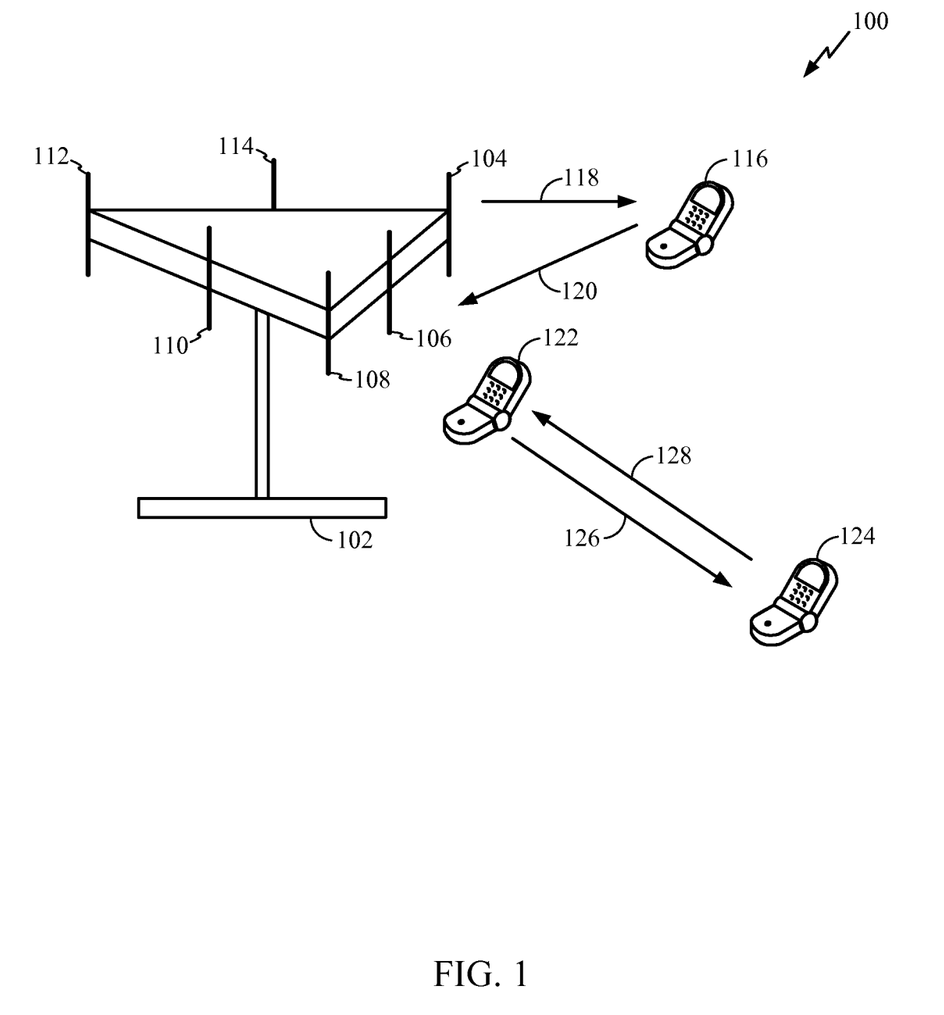
FIG. 1 illustrates an example wireless communication system in accordance with certain embodiments of the present disclosure.

Referring now to FIG. 1, illustrated is a wireless communication system 100 in accordance with various embodiments of the present disclosure. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, base station 102 can be a home base station, a Femto base station, and/or the like.

Base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

System 100 can be configured to allow nodes that have initiated a communication session over a network to move the session to a direct connection. Nodes that are directly connected can exchange packets natively without any encapsulation. In accordance with some embodiments, a "homeless" node can switch to a wireless network without losing its ongoing sessions. By "homeless" it is meant a node that does not have any home agent entity to provide assistance for keeping ongoing sessions alive while switching to foreign networks nor to forward any new incoming request(s) to establish new sessions to the node's current location. In accordance with some embodiments, nodes can be mobile (e.g., wireless), static (e.g., wired), or combinations thereof (e.g., one node static and a second node mobile, both nodes mobile, and so forth).

Figure 2:
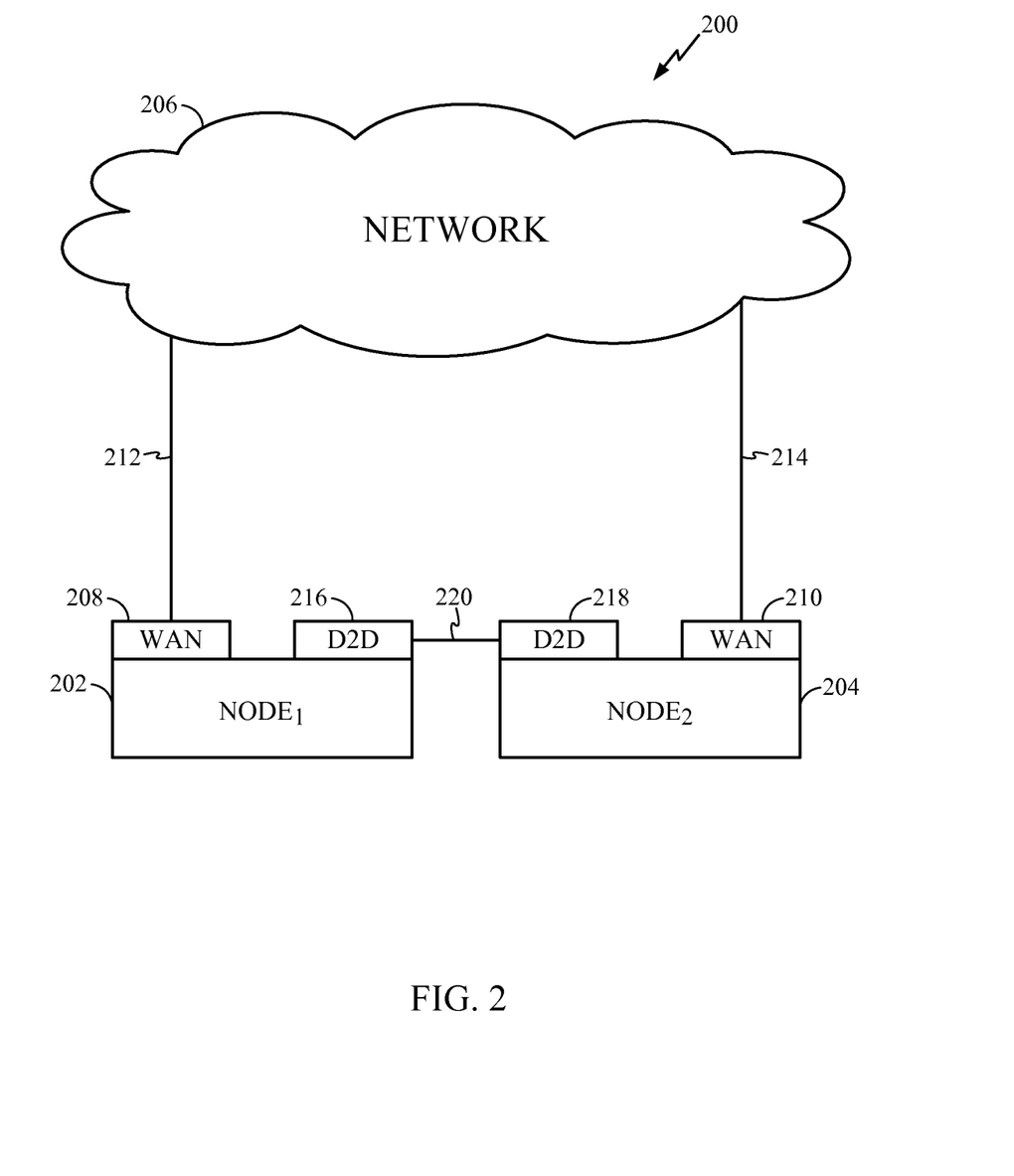
FIG. 2 illustrates a system that allows two nodes to communicate in accordance with certain embodiments of the present disclosure.

FIG. 2 illustrates a system 200 that allows two nodes to communicate over a Wide Area Network interface and/or a Device to Device interface, according to various embodiments. Included in system 200 are a first node (Node1) 202 and a second node (Node2) 204. Each node 202, 204 includes at least two interfaces. A first interface can be connected to a network 206 that provides Internet Protocol (IP) addresses. For example, the network can be a Wide Area Network (WAN), a Local Area Network (LAN), a home network, Digital Subscriber Line (DSL), cable, 3GPP based, 3GPP2 based, WiMAX based, WLAN based, or any other technology providing interconnectivity and routing to a network of interest (e.g., the Internet).

Interfaces of nodes 202 and 204 can be wired (e.g., Device to Device), wireless (e.g., WAN), or combinations thereof. For example, Node1 202 interface can be wireless and Node2 204 interface can be wired, or Node2 204 interface can be wireless and Node1 202 interface can be wired, both interfaces 202 and 204 can be wireless, or both interfaces 202 and 204 can be wired.

For illustration purposes, the first interface of each node 202, 204 is a WAN interface, 208 and 210. WAN interfaces 208, 210 provide a connection over network 206, illustrated by links 212 and 214. Further, each node 202, 204 includes at least a second interface that is connected to a local network with directly connected peers or a multi-hop mesh network. For example, the local network can be a Wireless Local Area Network (WLAN) or another device to device (e.g., peer to peer) technology. For illustration purposes, the second interface of each node 202, 204 is illustrated as a Device to Device (D2D) interface 216, 218. The D2D interfaces 216, 218 allow nodes 202, 204 to perform direct communications, illustrated by direct link 220.

A procedure according to various embodiments for starting a session over network 206 and moving to a direct session (e.g., over direct link 220) will now be described. For example purposes, it is assumed that node1 202 utilizes Mobile Internet Protocol. Communications are performed by node1 202 utilizing its Mobile IP home address as a source address. A home address is a unicast routable address assigned to a node and is used as the permanent address of the node. Node1 202 communicates with node2 204 over network 206 (e.g., WAN) by sending and receiving packets over respective first interfaces (e.g., WAN interfaces 208, 210). The packets can be encapsulated in a MIPv6 tunnel to a home agent, which can be included in network 206 according to various embodiments, or a route optimization tunnel directly to node2 204.

Figure 3:
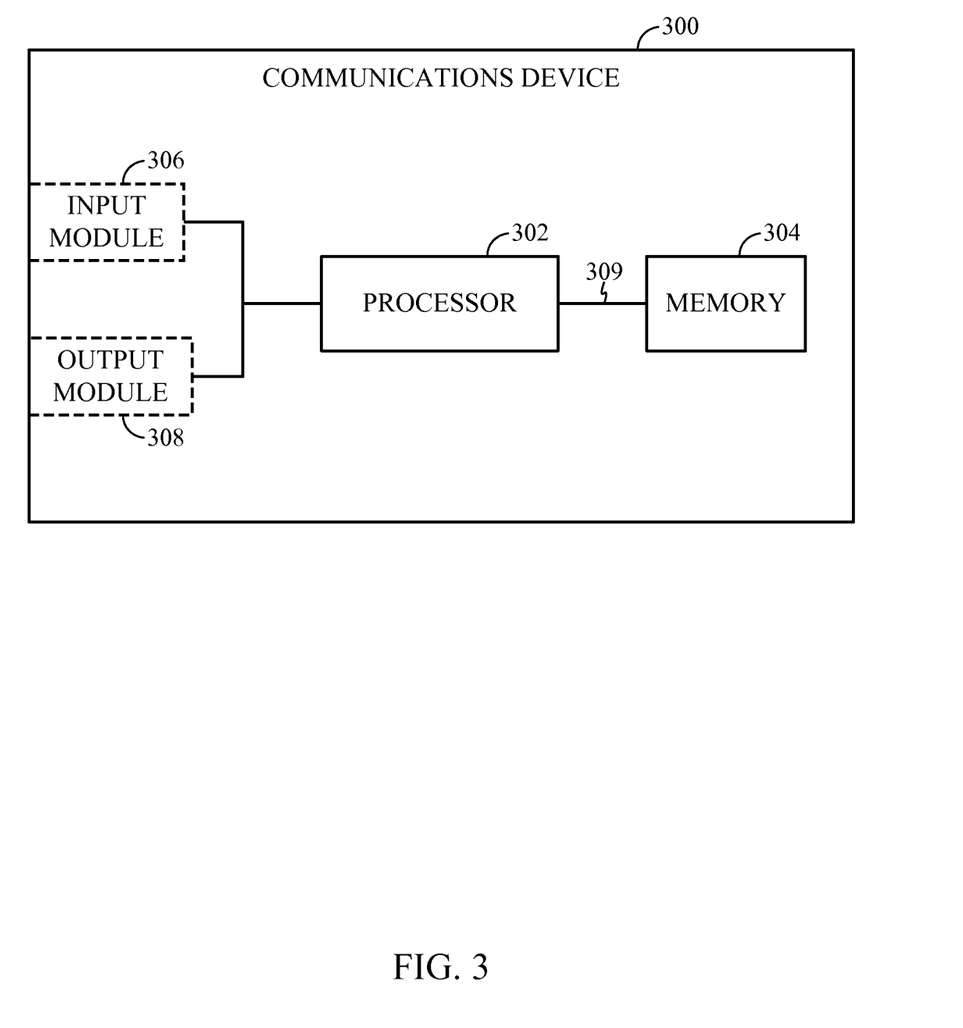
FIG. 3 illustrates an example of a communication device in accordance with certain embodiments of the present disclosure.

FIG. 3 illustrates an exemplary first communications device 300, in accordance with an exemplary embodiment. Exemplary first communications device 300 is, e.g., one of the wireless communications devices (102, 116, 122, 124) of FIG. 1 or one of the wireless communications devices (202, 204) of FIG. 2.

First communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a first signal from a second communications device; generate a first application alert if said first signal satisfies an application alert criteria; and receive a second signal from an access point said second signal carrying second communications device information based on a previous signal from the second communications device. The access point may be, and sometimes is, a base station. In some embodiments, the second communications device information is location information. In various embodiments, processor 302 is configured to receive said first signal via a wireless peer to peer interface as part of being configured to receive a first signal. In some embodiments, processor 302 is configured to receive the second signal via a wireless wide area network interface as part of being configured to receive the second signal.

Processor 302 is further configured to determine an operation to take based on the second communications device information included in the second signal and information included in said first signal. In one exemplary embodiment, said second communications device information included in the second signal is information on a previous location of said second communications device, said information included in the first signal is current location information, and said operation is one of a location based traffic update operation and a location based advertisement update operation. Processor 302, in some embodiments, is further configured to send an information request signal to the access point requesting information corresponding to the second communications device, in response to the generated first application alert.

Exemplary Registrations and Service Announcements in Peer-to-Peer Networks via Cellular Links As noted above, the overhead generated by a large number of nodes registering with peers and advertising their services may have a significant impact on overall bandwidth capacity of a peer-to-peer (P2P) network. In areas with dense population, this overhead may be the limiting factor for a number of nodes of the P2P network that are concurrently active.

In developed countries, there is typically a strong correlation between cellular service coverage from wireless operators and population density. Furthermore, in sparsely populated areas, cellular services by design can be limited by actual traffic between cellular nodes and base stations, and not by the administrative overhead.

Certain embodiments of the present disclosure propose a hybrid registration mechanism that may allow a wireless node of the P2P network to leverage the administrative architecture of a neighboring cellular system. According to certain embodiments, this may be accomplished by modifying (upgrading) the existing cellular infrastructure and by utilizing dual-mode devices as P2P nodes (i.e. devices that can operate in a cellular mode and in a P2P mode).

For example, a new function may be implemented on cellular base stations for the purpose of receiving service announcements from P2P nodes, consolidating service information, and leveraging cell-wide broadcast for efficiently disseminating the consolidated list of offered services to all P2P nodes within the coverage area. Given the strong correlation between node density and cellular infrastructure, the proposed hybrid approach may nearly completely eliminate limitations of P2P networks due to their administrative overhead. As will be described in greater detail below, embodiments of the present disclosure allow leverage of existing cellular standards together with the P2P network architecture, providing economic implementation of the disclosure.

Figure 4:
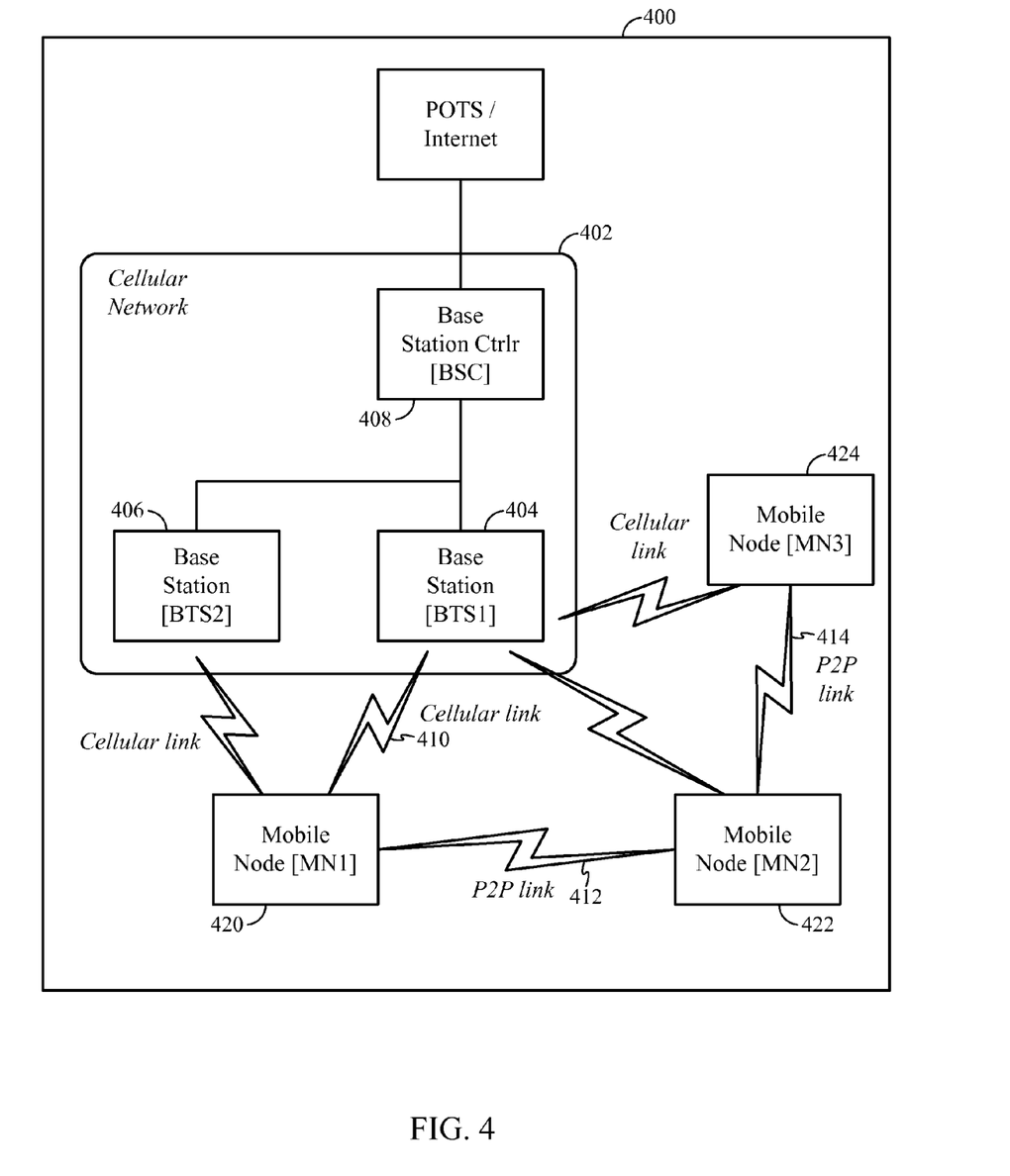
FIG. 4 illustrates example architecture of a cellular system with nodes capable of cellular service and peer-to-peer connectivity in accordance with certain embodiments of the present disclosure.

Certain embodiments of the present disclosure support registration of P2P nodes and announcements of their services by utilizing a cellular infrastructure. FIG. 4 illustrates an example architecture 400 of a cellular system 402 along with wireless nodes capable of cellular service and P2P connectivity. In the illustrated example, a mobile node 420 (i.e., node MN1) is in soft handoff between two base stations 404 and 406 (i.e., BTS1 and BTS2) of the cellular network 402, while both mobile nodes 422 and 424 (i.e., nodes MN2 and MN3) may establish a single link to the BTS1.

From the P2P perspective, MN1 may establish knowledge of and connectivity with MN2 through a P2P link 412, and MN2 with MN3 through a P2P link 414. Given the appropriate routing capabilities in MN2, MN1 may reach MN3 either through the cellular network 402 or via MN2. All mobile nodes may access common services such as voice and data through the cellular network 402.

Each mobile node in the system 400 may be outfitted with a cellular radio and a P2P radio, which may be operated concurrently. The concurrency may be achieved by using two physically separate radios that operates independently, by a common controller with multiple receive and transmit chains, or by a common multi-mode capable radio that may use time-slotting to serve both link types. Each mobile node may comprise a list of active services it can provide to other mobile nodes. Such services may include voice (walkie-talkie mode), data relaying, content serving (e.g. user-generated device-local content), or the like.

The mobile node may participate in P2P actions in two steps. First, a registration mechanism may be utilized to establish a unique identification of each mobile node. Other functions such as authorizing the device based on authorization information obtained from a registration message, spectrum access control, etc. may be also performed in this step. Second, each mobile node may transmit an advertisement for the list of services the node is configured to perform. Based on congestion in the P2P network, the service advertisement may be repeatedly sent at varying intervals. The mobile node of the P2P network may maintain a list of offered services and identifications (IDs) of the respective mobile nodes that advertise them. At this point, each mobile node may possess knowledge of other mobile nodes it can connect to, and of the services that these nodes can provide.

When a mobile node (e.g., MN1 from FIG. 4) is within the coverage of a base station of a cellular network (e.g., the BTS1 from FIG. 4), MN1 may additionally send its registration information and service advertisement to the BTS1 via an access channel 410. A peer-to-peer controller at MN1 may leverage the knowledge of a search algorithm of a cellular controller 408 to determine when a new pilot of the base station is detected (i.e., the pilot of the BTS1), or a previously existing pilot from the set of active pilots that belongs to some other base station of the cellular network 402 is lost.

A peer-to-peer function in the BTS1 may be configured in such a way to process device registrations (e.g. device and access authorization). Furthermore, the BTS1 may be able to maintain a consolidated list of all service announces in its coverage area and respective devices offering these services. This consolidated list of services may be then broadcast on an overhead channel of the BTS1 whenever a service entry is changed. The peer-to-peer function in the BTS1 may also utilize other algorithms to identify when a broadcast is required, such as a periodic transmission in order to associate lifetimes with consolidated service entries.

Exemplary Embodiments using CDMA Technology

In one embodiment of the present disclosure, mobile nodes of a P2P network may be equipped with a CDMA2000 (Code Division Multiple Access)/1xEvDO (Evolution Data Optimized) modem for cellular service and with a P2P capable 802.11 modem. P2P connectivity over the 802.11 modem may be complemented by an application layer protocol defining registration messages and services announcements. A specific User Datagram Protocol (UDP) port may be assigned to all participating devices for reception of these messages.

For concurrent use, an extended CDMA access channel may be utilized for transmission of P2P registration information and service advertisements instead of the 802.11 access channel. A base station of a cellular network may comprise a software module that performs the P2P function described above. An extended overhead message may be used to broadcast the consolidated list of services to all devices within the coverage area (i.e., sector) of the base station.

Figure 5:
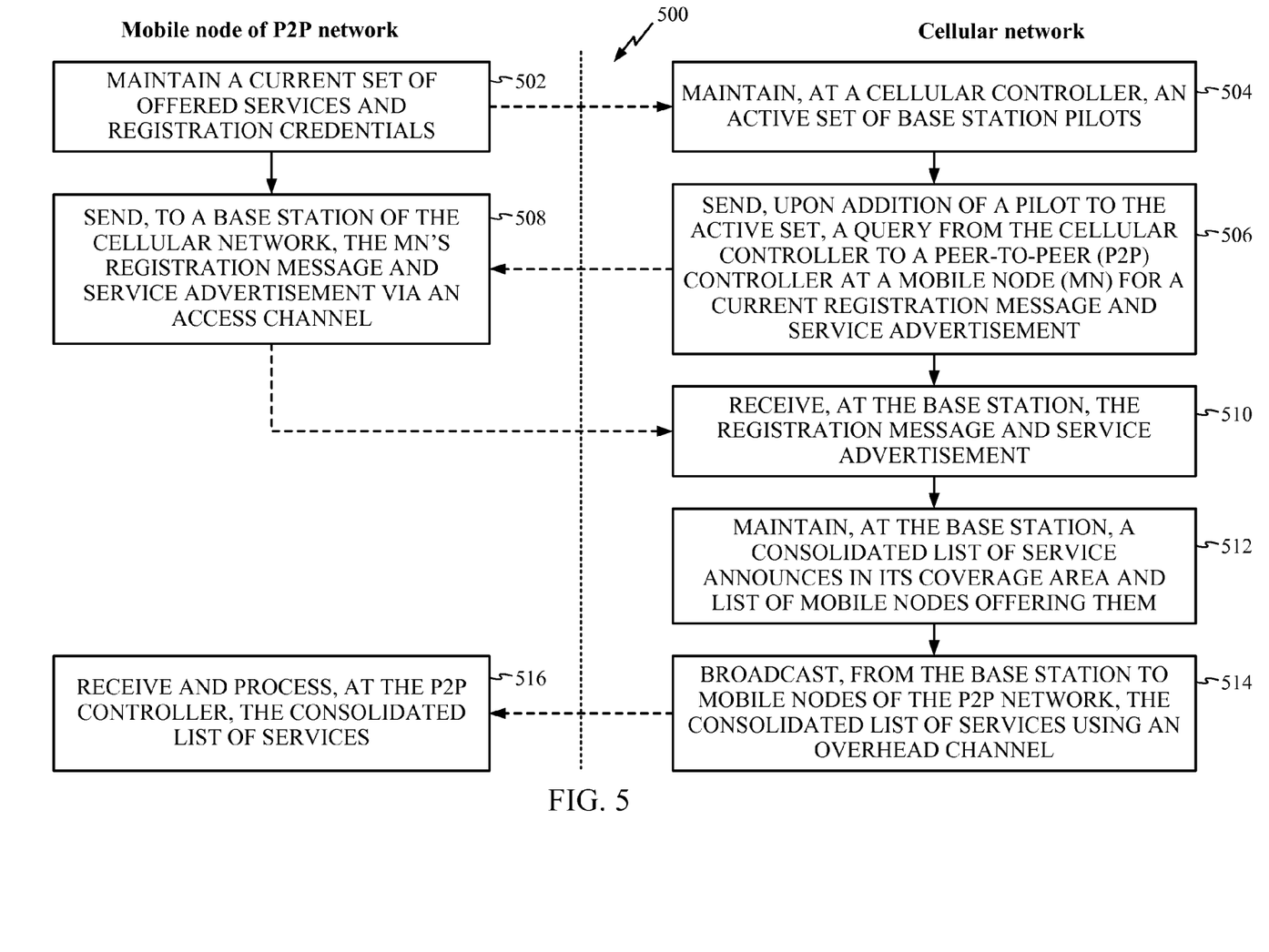
FIG. 5 illustrates example operations for managing registrations and service announcements in a peer-to-peer network by using an infrastructure of a cellular network in accordance with certain embodiments of the present disclosure.

FIG. 5 illustrates example operations 500 for managing registrations and service announcements in peer-to-peer networks by using a cellular infrastructure in accordance with certain embodiments of the present disclosure. Operations 502, 508 and 516 may be performed at a mobile node of a P2P network, and operations 504-506, 510-514 may be performed at a cellular network, such as, for example, the CDMA network.

At 502, a peer-to-peer controller within a mobile node may maintain a current set of offered services, as well as required registration credentials. At 504, a cellular controller (e.g., the CDMA controller) may perform maintenance of an active set of base station pilots within the cellular network as defined by the standard. Upon addition of a pilot to the active set, the CDMA controller may query, at 506, the peer-to-peer controller within the mobile node for a current registration message and service advertisement. At 508, as a response to the query, the mobile node may send the registration message and service advertisement to an active base station of the cellular network.

At 510, the base station may receive the node's registration message and service advertisement. At 512, the base station may process the received information and may maintain a consolidated list of all service announces in its coverage area and respective devices (i.e., mobile nodes of the peer-to-peer network) offering these services. The consolidated service list may be forwarded, at 514, from the base station to the P2P controller via an overhead channel. At 516, the consolidated list of services may be received and processed by the P2P controller of the mobile node. The CDMA controller may also notify the P2P controller when there is no base station in the active set in order to trigger fallback to a pure P2P mode where registration information and service advertisements are sent directly over the 802.11 access channel.

Figure 5A:
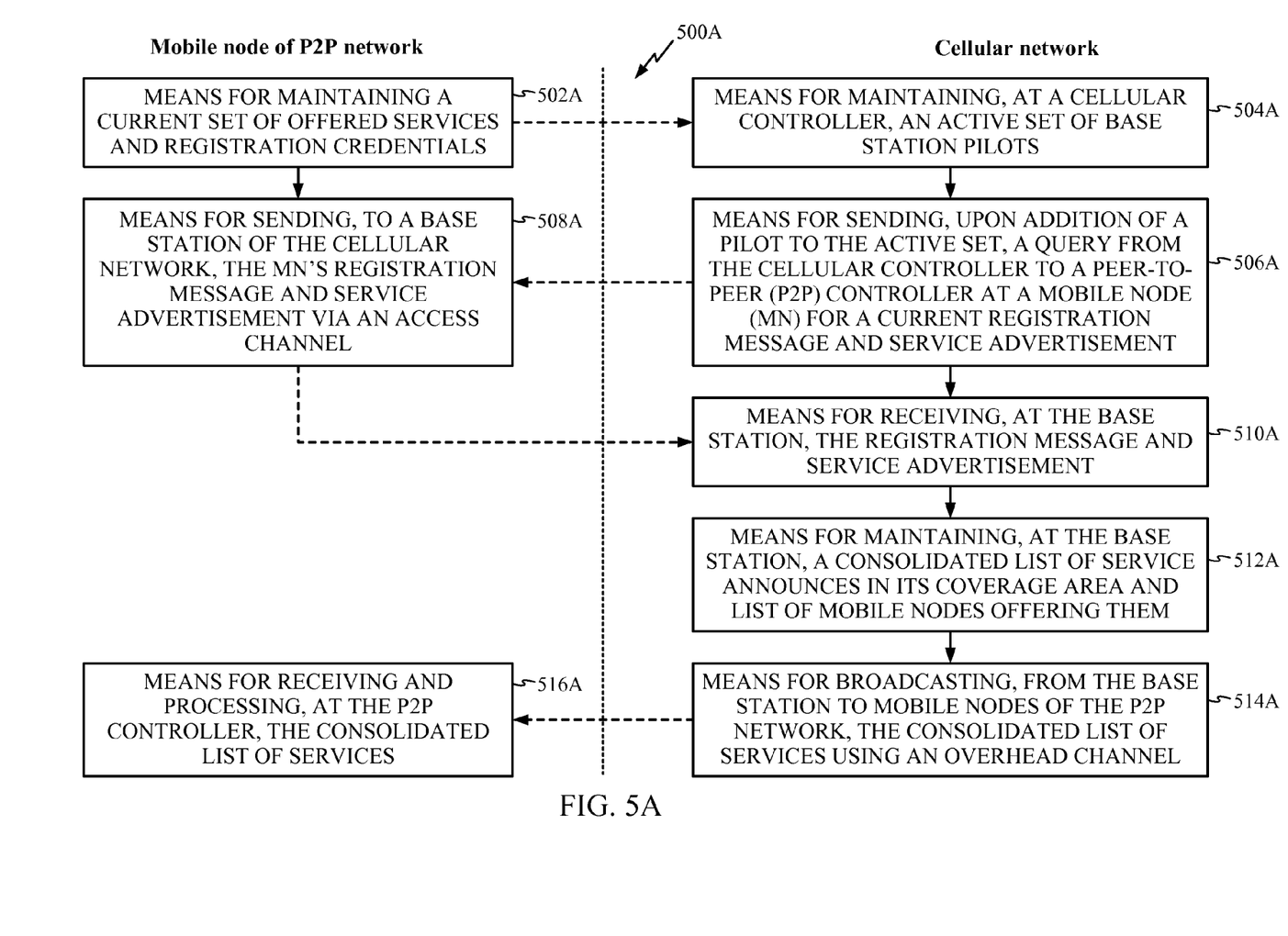
FIG. 5A illustrates example components capable of performing the operations illustrated in FIG. 5.

The various operations of methods described above may be performed by various hardware and/or software component (s) and/or module(s) corresponding to means-plus-function blocks illustrated in the Figures. For example, blocks 502-516 illustrated in FIG. 5 correspond to means-plus-function blocks 502A-516A illustrated in FIG. 5A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray™ disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for wireless communications by a wireless node in a peer-to-peer network, comprising:
    maintaining, at the wireless node, a list of available services offered in the peer-to-peer network;
    receiving, at the wireless node from a base station of a cellular network, a consolidated list of services offered by one or more wireless nodes of the peer-to-peer network within a coverage area of the base station; and
    updating the list of available services based on information in the consolidated list received from the base station.

2. The method of claim 1, wherein the consolidated list of services comprises an identification of at least one wireless node offering the services, and registration information for the at least one wireless node.

3. The method of claim 1, further comprising:
    transmitting, to the base station, an advertisement of one or more services offered by the wireless node and registration information for the wireless node.

4. The method of claim 3, wherein the registration information for the wireless node comprises at least one of: a unique identification of the wireless node, and authorization information for the wireless node.

5. The method of claim 3, wherein the advertisement of the offered services is transmitted when a new pilot associated with the base station is detected at the wireless node.

6. The method of claim 3, wherein the advertisement is transmitted as a response to a query from a cellular controller of the cellular network.

7. A method for wireless communications by a base station of a cellular network, comprising:
    receiving, from at least one wireless node of a peer-to-peer network, at least one advertisement of one or more services offered by the at least one wireless node;
    updating a consolidated list of services offered by wireless nodes of the peer-to-peer network that are within a coverage area of the base station to include the services offered by the at least one wireless node; and
    broadcasting the consolidated list of services, from the base station, to one or more wireless nodes of the peer-to-peer network.

8. The method of claim 7, wherein:
    the at least one advertisement comprises registration information for the at least one wireless node; and
    updating the consolidated list comprises updating the consolidated list to include the registration information.

9. The method of claim 8, further comprising:
    processing the registration information by authorizing the at least one wireless node for communication in the peer-to-peer network and authorizing channel access to the at least one wireless node.

10. The method of claim 7, wherein the consolidated list of services is broadcast when the consolidated list is changed.

11. An apparatus for wireless communications by a wireless node in a peer-to-peer network, comprising:
    logic for maintaining, at the wireless node, a list of available services offered in the peer-to-peer network;
    logic for receiving, at the wireless node from a base station of a cellular network, a consolidated list of services offered by one or more wireless nodes of the peer-to-peer network within a coverage area of the base station; and logic for updating the list of available services based on information in the consolidated list received from the base station.

12. The apparatus of claim 11, wherein the consolidated list of services comprises an identification of at least one wireless node offering the services, and registration information for the at least one wireless node.

13. The apparatus of claim 11, further comprising:
logic for transmitting, to the base station, an advertisement of one or more services offered by the wireless node and registration information for the wireless node.

14. The apparatus of claim 13, wherein the registration information for the wireless node comprises at least one of: a unique identification of the wireless node, and authorization information for the wireless node.

15. The apparatus of claim 13, wherein the advertisement of the offered services is transmitted when a new pilot associated with the base station is detected at the wireless node.

16. The apparatus of claim 13, wherein the advertisement is transmitted as a response to a query from a cellular controller of the cellular network.

17. An apparatus for wireless communications by a base station of a cellular network, comprising:
logic for receiving, from at least one wireless node of a peer-to-peer network, at least one advertisement of one or more services offered by the at least one wireless node;
logic for updating a consolidated list of services offered by wireless nodes of the peer-to-peer network that are within a coverage area of the base station to include the services offered by the at least one wireless node; and
logic for broadcasting the consolidated list of services, from the base station, to one or more wireless nodes of the peer-to-peer network.

18. The apparatus of claim 17, wherein:
the at least one advertisement comprises registration information for the at least one wireless node; and
the logic for updating the consolidated list comprises logic for updating the consolidated list to include the registration information.

19. The apparatus of claim 18, further comprising:
logic for processing the registration information by authorizing the at least one wireless node for communication in the peer-to-peer network and authorizing channel access to the at least one wireless node.

20. The apparatus of claim 17, wherein the consolidated list of services is broadcast when the consolidated list is changed.

21. An apparatus for wireless communications by a wireless node in a peer-to-peer network, comprising:
means for maintaining, at the wireless node, a list of available services offered in the peer-to-peer network;
means for receiving, at the wireless node from a base station of a cellular network, a consolidated list of services offered by one or more wireless nodes of the peer-to-peer network within a coverage area of the base station; and
means for updating the list of available services based on information in the consolidated list received from the base station.

22. The apparatus of claim 21, wherein the consolidated list of services comprises an identification of at least one wireless node offering the services, and registration information for the at least one wireless node.

23. The apparatus of claim 21, further comprising:
means for transmitting, to the base station, an advertisement of one or more services offered by the wireless node and registration information for the wireless node.

24. The apparatus of claim 23, wherein the registration information for the wireless node comprises at least one of: a unique identification of the wireless node, and authorization information for the wireless node.

25. The apparatus of claim 23, wherein the advertisement of the offered services is transmitted when a new pilot associated with the base station is detected at the wireless node.

26. The apparatus of claim 23, wherein the advertisement is transmitted as a response to a query from a cellular controller of the cellular network.

27. An apparatus for wireless communications by a base station of a cellular network, comprising:
means for receiving, from at least one wireless node of a peer-to-peer network, at least one advertisement of one or more services offered by the at least one wireless node;
means for updating a consolidated list of services offered by wireless nodes of the peer-to-peer network that are within a coverage area of the base station to include the services offered by the at least one wireless node; and
means for broadcasting the consolidated list of services, from the base station, to one or more wireless nodes of the peer-to-peer network.

28. The apparatus of claim 27, wherein:
the at least one advertisement comprises registration information for the at least one wireless node; and
the means for updating the consolidated list comprises means for updating the consolidated list to include the registration information.

29. The apparatus of claim 28, further comprising:
means for processing the registration information by authorizing the at least one wireless node for communication in the peer-to-peer network and authorizing channel access to the at least one wireless node.

30. The apparatus of claim 27, wherein the consolidated list of services is broadcast when the consolidated list is changed.

31. A computer-program product for wireless communications by a wireless node in a peer-to-peer network, comprising a non-transitory computer-readable storage device having instructions stored thereon, the instructions being executable by one or more processors and the instructions comprising:
instructions for maintaining, at the wireless node, a list of available services offered in the peer-to-peer network;
instructions for receiving, at the wireless node from a base station of a cellular network, a consolidated list of services offered by one or more wireless nodes of the peer-to-peer network within a coverage area of the base station; and
instructions for updating the list of available services based on information in the consolidated list received from the base station.

32. The computer-program product of claim 31, wherein the consolidated list of services comprises an identification of at least one wireless node offering the services, and registration information for the at least one wireless node.

33. The computer-program product of claim 31, wherein the instructions further comprise:
instructions for transmitting, to the base station, an advertisement of one or more services offered by the wireless node and registration information for the wireless node.

34. The computer-program product of claim 33, wherein the registration information for the wireless node comprises at least one of: a unique identification of the wireless node, and authorization information for the wireless node.

35. The computer-program product of claim 33, wherein the advertisement of the offered services is transmitted when a new pilot associated with the base station is detected at the wireless node.

36. The computer-program product of claim 33, wherein the advertisement is transmitted as a response to a query from a cellular controller of the cellular network.

37. A computer-program product for wireless communications by a base station of a cellular network, comprising a non-transitory computer-readable storage device having instructions stored thereon, the instructions being executable by one or more processors and the instructions comprising:

instructions for receiving, from at least one wireless node of a peer-to-peer network, at least one advertisement of one or more services offered by the at least one wireless node;

instructions for updating a consolidated list of services offered by wireless nodes of the peer-to-peer network that are within a coverage area of the base station to include the services offered by the at least one wireless node; and     instructions for broadcasting the consolidated list of services, from the base station, to one or more wireless nodes of the peer-to-peer network.

38. The computer-program product of claim 37, wherein:

the at least one advertisement comprises registration information for the at least one wireless node; and     the instructions for updating the consolidated list further comprise instructions for updating the consolidated list to include the registration information.

39. The computer-program product of claim 38, wherein the instructions further comprise:

instructions for processing the registration information by authorizing the at least one wireless node for communication in the peer-to-peer network and authorizing channel access to the at least one wireless node.

40. The computer-program product of claim 37, wherein the consolidated list of services is broadcast when the consolidated list is changed.

\* \* \* \* \*